United States Patent [19]

Knauer et al.

[11] 3,868,550
[45] Feb. 25, 1975

[54] CIRCUIT BREAKER
[75] Inventors: Wolfgang Knauer; Michael A. Lutz, both of Malibu, Calif.
[73] Assignee: Hughes Aircraft Company, Culver City, Calif.
[22] Filed: Dec. 26, 1973
[21] Appl. No.: 428,636

Related U.S. Application Data
[63] Continuation-in-part of Ser. No. 333,434, Feb. 16, 1973, abandoned.

[52] U.S. Cl. ............... 317/11 B, 307/136, 317/11 E
[51] Int. Cl. ............................................. H02h 7/22
[58] Field of Search ............. 317/11 A, 11 B, 11 E; 307/136

[56] References Cited
UNITED STATES PATENTS
3,198,986  8/1965  Luehring et al................... 317/11 E
3,714,510  1/1973  Hofmann............................ 317/11 B
3,753,042  8/1973  Kind et al.......................... 317/11 B

*Primary Examiner*—James D. Trammell
*Attorney, Agent, or Firm*—Allen A. Dicke, Jr.; W. H. MacAllister

[57] ABSTRACT

The circuit breaker interrupts current against a high voltage source by opening an in-line switch and causing termination of conduction therethrough by discharging a parallel capacitor to produce a current zero. The parallel capacitor has a crossed-field switch in series therewith to control the rate of voltage application to the parallel in-line switch, and, furthermore, to limit the voltage applied to the capacitor to a small fraction of the full circuit voltage.

8 Claims, 9 Drawing Figures

CIRCUIT BREAKER

CROSS REFERENCE

This application is a continuation-in-part of patent application Ser. No. 333,434, now abandoned, filed Feb. 16, 1973.

BACKGROUND

This invention is directed to a circuit breaker particularly adapted for breaking high voltage DC circuits wherein an in-line switch is force-commutated. The circuit breaker has a commutation circuit which does not require a full voltage commutation capacitor.

In general, the prior art in offswitching of high voltage lines, particularly DC systems or AC systems before a natural current zero is reached, comprises an in-line switch which carries the normal current flow and which is opened. This opening causes arcing. Deionization of the opened and arcing in-line switch is caused by force-commutating the current in the open in-line switch. This is accomplished by discharging a capacitor through the in-line switch in appropriate polarity to cause a current zero. An example of this circuit breaker structure is shown in A. N. Greenwood U.S. Pat. No. 3,435,288. Another example is seen in Bo Breitholtz U.S. Pat. No. 3,522,472.

The Greenwood patent requires the use of a capacitor which is capable of withstanding a voltage at least equal to the line voltage and which is sufficiently large to keep the rate of voltage application to the in-line device below a critical value at which reignition occurs. W. Long and M. A. Lutz U.S. Pat. No. 3,660,723 is an improvement over the Greenwood patent, because it accomplishes circuit interruption by force-commutation of an in-line device with a low voltage capacitor, two auxiliary low voltage switches, and a crossed-field switch thus eliminating the need for a large high voltage commutation capacitor. This invention is a further step forward by accomplishing interruption through force-commutation in an arcing in-line device with only a low voltage commutation capacitor and a crossed-field switch, thus eliminating the need for auxiliary switches and for a large, full voltage commutation capacitor.

Similar circumstances arise in the use of silicon-controlled rectifiers (SCR) as the switching device in the line. In such cases, it is well-known that the removal of the conducting signal from the gate does not cause termination of conduction. What is needed is a cessation of current. This is sometimes accomplished by discharging a capacitor through the SCR in appropriate polarity to cause a current zero, so that the SCR becomes nonconductive. An SCR is superior to a mechanical in-line switch because of the greater speed at which it can be offswitched.

SUMMARY

In order to aid in the understanding of this invention, it can be stated in essentially summary form that it is directed to a circuit breaker. The circuit breaker has an in-line device, which switch is either a mechanical switch or an SCR and is openable during passage of current therethrough. A series circuit of a capacitor and a crossed-field switch device is connected in parallel to the in-line switch. When the in-line device is open, the crossed-field switch is turned on to discharge the capacitor to produce a current zero in the in-line switch so that the in-line switch ceases conduction. Thereupon, the crossed-field switch can be turned off to turn off the parallel circuit. The method comprises the operation of these components.

It is thus an object of this invention to provide a circuit breaker which includes an in-line switch and a parallel circuit for deionizing the in-line switch and for limiting the rate of voltage application, whereby the parallel circuit is comprised of a serially-connected capacitor and crossed-field switch device. It is another object to provide a method of operation of such a circuit including the step of turning off the crossed-field switch device before the commutating capacitor is charged to system voltage. It is a further object to provide a circuit breaker which includes an energy-absorbing resistor further in parallel to the in-line switch and its force-commutation circuit. It is still another object of this invention to provide an in-line switch and force-commutation circuit. It is still another object of this invention to provide an in-line switch and force-commutation circuit which is applicable to offswitching alternating current as well as direct current whereby offswitching of the alternating current is achieved before the first occurrence of a natural current zero in the in-line switch.

It is a further object to provide a circuit breaker which includes an SCR in the main line as an in-line offswitching device, together with a parallel circuit for causing the SCR to become nonconductive by causing a current zero therethrough when the SCR gate is biased in the nonconductive condition. It is a further object to provide the current zero by applying an offswitching pulse from a capacitor which is rated below the normal line voltage. It is a further object to connect in parallel to an SCR in-line device a series combination of a capacitor and a crossed-field switch tube so that the capacitor can be discharged through the SCR to produce a current zero, and the crossed-field switch tube can be switched off before the capacitor voltage reaches line voltage. Other objects and advantages of this invention will become apparent from a study of the following portion of the specification, the claims, and the attached drawings.

DESCRIPTION

Figure 1:
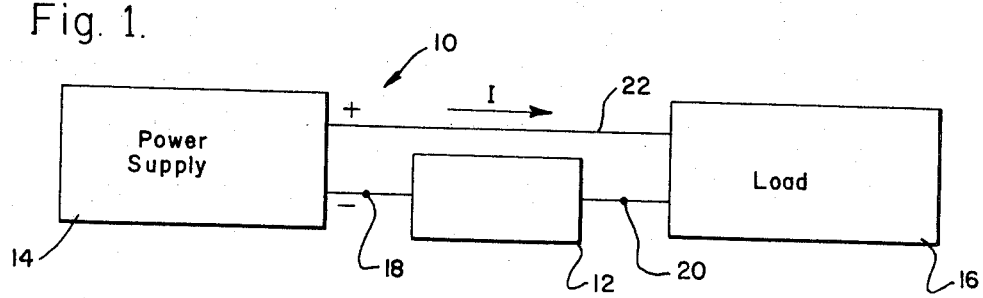
FIG. 1 is a block diagram showing the circuit breaker of this invention in a power system.

FIG. 1 illustrates a power system 10 in which the circuit breaker 12 of this invention can be connected for the control of current flow in the power system. The power system comprises a power supply 14 and a load 16 which are connected by two circuit mains. Circuit breaker 12 is illustrated as being connected at terminals 18 and 20 in one of the mains. The other main 22 can also be equipped with a circuit breaker, if the circuit requires it. Furthermore, if there are more than two mains, each may be equipped with a circuit breaker. A. Knauer U.S. Pat. No. 3,657,607 and M. A. Lutz and W. F. Long U.S. Pat. No. 3,660,723 show additional detail of an illustrative power system in which the circuit breaker 12 of this invention can be connected. Both of these patents show both of the mains as being protected by a circuit breaker.

Figure 2:
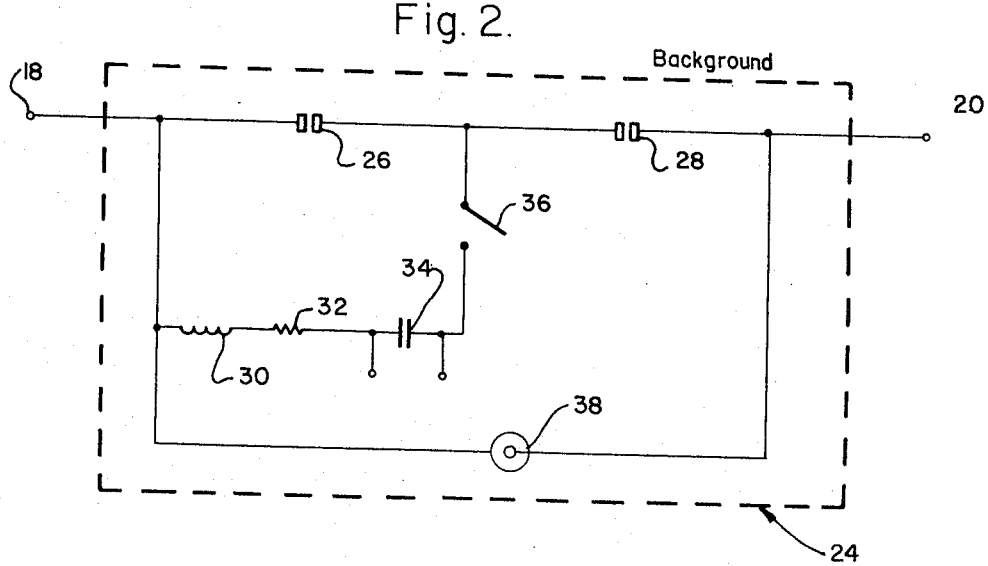
FIG. 2 is a schematic diagram showing a prior art circuit for force commutation of an in-line switch.

FIG. 2 illustrates a circuit breaker 24 which represents background for consideration with respect to the circuit breaker of this invention. Circuit breaker 24 has first and second in-line switch devices 26 and 28 serially-connected between the terminals 18 and 20. Switch devices 26 and 28 are mechanical switches which are closed during normal circuit condition. They can be switches on the order of the switches disclosed in patent application Ser. No. 255,655 filed May 22, 1972 by Noel Reed entitled "High Speed Switch Device." Furthermore, they can be interrupters as disclosed in Waghorne U.S. Pat. No. 3,268,687, Lafferty U.S. Pat. No. 3,290,542, and Greenwood U.S. Pat. No. 3,435,288.

A series combination of inductor 30, resistor 32, charged capacitor 34, and switch 36 is paralleled around first in-line switch device 26. Furthermore, a branch containing crossed-field switch device 38 is paralleled around the series combination of both first and second in-line switches 26 and 28. Crossed-field device 38 is an off-switching device which is capable of off-switching DC against a high circuit voltage. Such crossed-field switch devices are shown in G. A. G. Hofmann and R. C. Knechtli U.S. Pat. No. 3,558,960, G. A. G. Hofmann patent 3,604,977, R. E. Lund and G. A. G. Hofmann U.S. Pat. No. 3,641,384, M. A. Lutz and R. C. Knechtli U.S. Pat. No. 3,638,061, and K. T. Lian U.S. Pat. No. 3,534,226.

When it is desired to off-switch circuit breaker 24, first and second in-line switch devices 26 and 28 are opened, preferably simultaneously, although the second in-line switch device 28 can be opened slightly after the first one. When the first in-line switch device 26 is open and is conducting by arcing, switch 36 is closed to discharge capacitor 34 through the arcing in-line switch device 26 in such a direction as to induce a current zero in the in-line switch device 26. Now the line current flows through capacitor 34 with voltage rising thereacross to a point where the voltage is sufficiently high to cause initiation of conduction of crossed-field device 38. Crossed-field switch device 38 has been in a magnetic condition such that, with the application of an electric field thereacross, conduction would start. With the circuit current now flowing through crossed-field switch device 38 current flow through second in-line switch device 28 is reduced to below the chopping current. Thereupon, second in-line switch device 28 ceases conduction. After sufficient length of time to permit the interelectrode space of switch device 28 to deionize, crossed-field switch device 38 can be turned off. Circuit breaker 24 is only useful in the circuits where the circuit energy is fairly low and fairly high off-switching voltage transients can be tolerated. Where more line energy most be absorbed with a reduction in off-switching voltage transients, branches containing crossed-field off-switching devices with serial energy-absorbing resistances can be connected parallel to the cross-field switch device 38. M. A. Lutz and W. F. Long U.S. Pat. No. 3,660,723 illustrates such additional branches.

Figure 3:
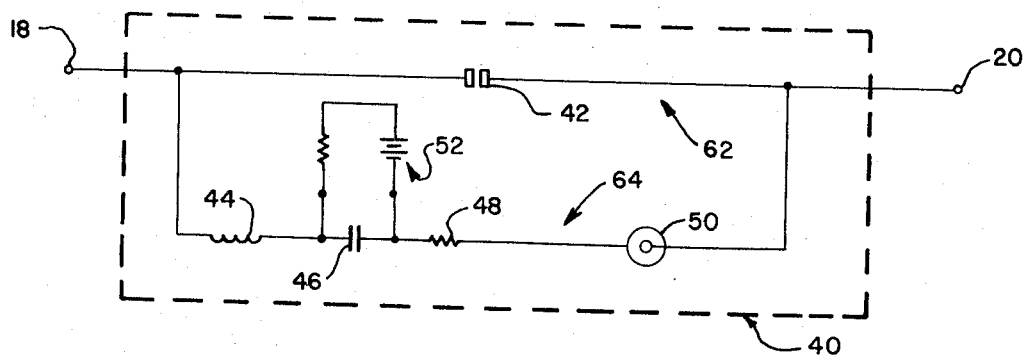
FIG. 3 is a schematic diagram of the forced commutation circuit of this invention.

FIG. 3 schematically illustrates circuit breaker 40 of this invention. The circuit breaker 40 is a basic circuit breaker arrangement. It has an in-line device 42 which is capable of carrying the normal circuit current. Any of the devices described with respect to the in-line switch device 26 are suitable and may be employed as the in-line device 42. Paralleled around the in-line device 42 is a series combination of an inductor 44, capacitor 46, resistor 48, and crossed-field switch device 50. Crossed-field device 50 is identical to device 38, and any of the switch devices described in conjunction with crossed-field switch device 38 are equally applicable as the crossed-field switch device 50. Charging means 52 is connected across the capacitor for providing its initial charge.

Figure 4:
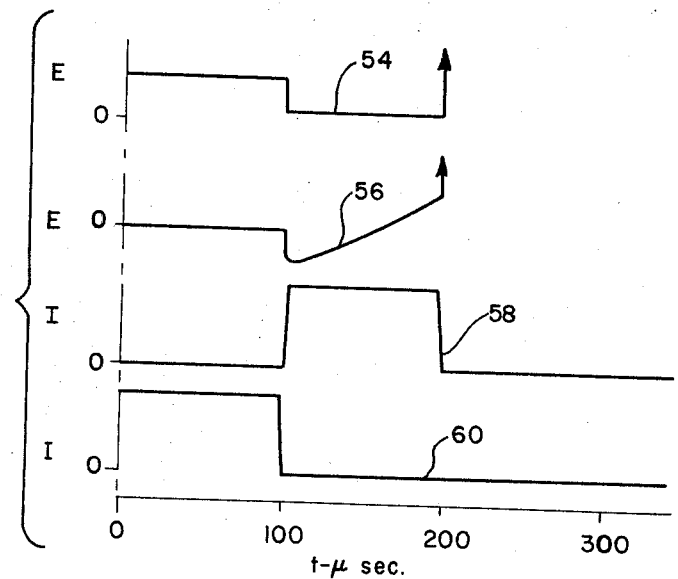
FIG. 4 is a graph showing the change in parameters versus time during offswitching using the force commutation circuit of this invention.

The operation of circuit breaker 40 will be described in conjunction with the graph of FIG. 4, which shows the change in several system values as the circuit breaker is actuated. In FIG. 4, trace 54 shows the change in value of the interrupter voltage, the voltage across crossed-field switch device 50, with time. Trace 56 shows the voltage across the in-line switch device 42. Trace 58 shows the current through crossed-field switch device 50. Trace 60 shows the current through in-line switch device 42. Before the interruption cycle, in-line switch 42 is closed, and the normal circuit current is flowing therethrough, as indicated by trace 60. Furthermore, the voltage drop across the in-line switch is substantially zero, as indicated by trace 56. Crossed-field switch device 50 is turned off, with a zero current therethrough, as indicated at the beginning of trace 58. It carries thereacross the voltage of charged capacitor 46, as illustrated at the beginning of trace 54. At time zero switch 42 is opened, and the arc voltage drop is not sufficiently appreciable to show upon the trace 56. After switch 42 has opened sufficiently far to withstand the full circuit voltage (indicated to be 100 $\mu$ sec in FIG. 4), crossed-field switch device 50 is turned on to discharge capacitor 46 in such a direction as to cause a current zero in open arcing in-line switch device 42. Trace 56 illustrates a reduction in voltage in the in-line device, to indicate a voltage reversal whereby the current through the in-line device drops to zero, as indicated in trace 60. Note also that the voltage drop across the crossed-field device 50 as indicated by trace 54, drops to the conduction voltage drop of the device. During the time the crossed-field switch device 50 is conducting at the lowest horizontal part of trace 54, capacitor 46 is charging to cause a slight increase in voltage across the in-line switch 42, in accordance with trace 56. This continues for a sufficient length of time to permit the in-line device 42 to deionize. Thereupon, the crossed-field switch device is turned off to bring the current therethrough to zero, as indicated by trace 58, and is accompanied by an increased voltage thereacross, as indicated by trace 54. By this means, the circuit is turned off before capacitor 46 is charged to a significant fraction, e.g., more than half, of line voltage. Where it is desired that the capacitor 46 be protected against excessive voltage, a safety spark gap can be connected in parallel to capacitor 46. This protects capacitor 46 from over-voltage which could occur in case of failure of the crossed-field switch device 50 to off-switch or to be signalled too late in the off-switching cycle. As illustrated in FIG. 4, the entire cycle can be accomplished in about 100 microseconds, but the cycle time is controlled by the deionization time of the in-line switch 42. The value of capacitor 46 is chosen to be large so that conduction can continue for an appreciable time without build up of excessive voltages across the capacitor. For interruption of a 10 kilo-ampere current with a 100 $\mu$ sec deionization time for switch 42, a 100 $\mu$ F capacitor rated for 10 kv is adequate.

As previously discussed, circuit breaker 40 is useful in those circumstances where there is not a great amount of system energy so that the voltage surges during off-switching are not excessive. The circuit breaker 40 illustrates the inter relationship between the in-line branch 62 and interrupter branch 64. The circuit breaker 40 with these branches can be employed in systems wherein a plurality of branches are interconnected to absorb system energy in a plurality of branches. Such a system is taught by M. A. Lutz U.S. Pat. No. 3,611,031.

Figure 5:
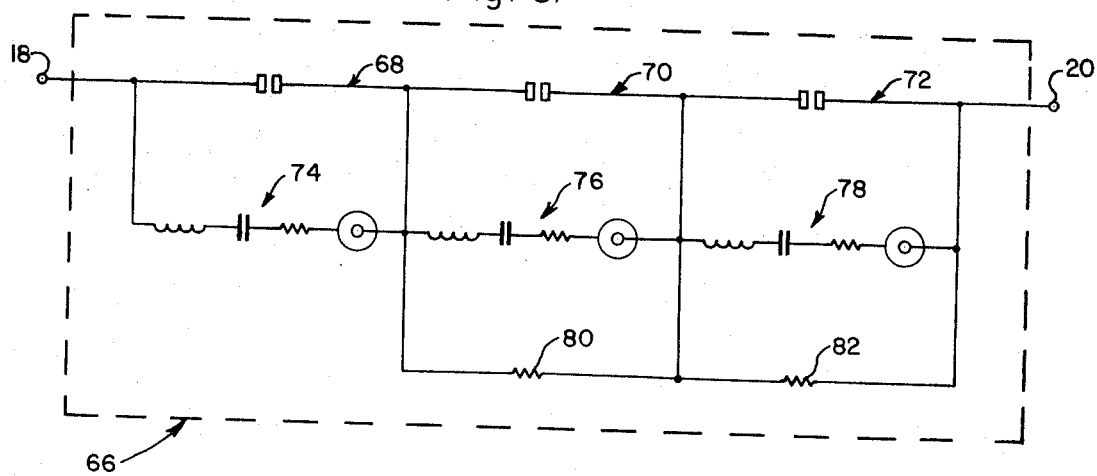
FIG. 5 shows a sequential circuit breaker employing the circuit.

FIG. 5 illustrates a circuit breaker 66 which has such a plurality of branches and can be connected between the terminals 18 and 20. Circuit breaker 66 has serially-connected in-line branches 68, 70, and 72, which respectively have interrupter branches 74, 76, and 78 connected in parallel thereto. These in-line branches and interrupter branches are identical to the corresponding branches 62 and 64 in FIG. 3. Energy-absorbing resistors 80 and 82 are respectively connected in parallel to interrupter branches 76 and 78. When circuit breaker 66 is to interrupt the system, first in-line branch 72 and interrupter branch 78 are actuated to force current flow through resistor 82 to insert that impedance into the system. The value of resistor 82 is such as to prevent excessive voltage transients, but cause reduction in system current. A capacitor can be connected in parallel to each of the in-line switch devices, to control and limit changes in voltage with respect to time. At a subsequent time, when circuit breaker voltage and system current decay, in-line branch 70 and interrupter branch 76 are opened to force the system current through the series-connected resistors 80 and 82. Again, when voltage and current decays, the circuit breaker can be fully off-switched without excessive transients by opening in-line branch 68 and interrupter branch 74. Thus, the circuit breaker 66 opens the circuit. Other arrange-ments by which the system impedance is sequentially increased are illustrated in K. T. Lian U.S. Pat. No. 3,534,226.

Figure 6:
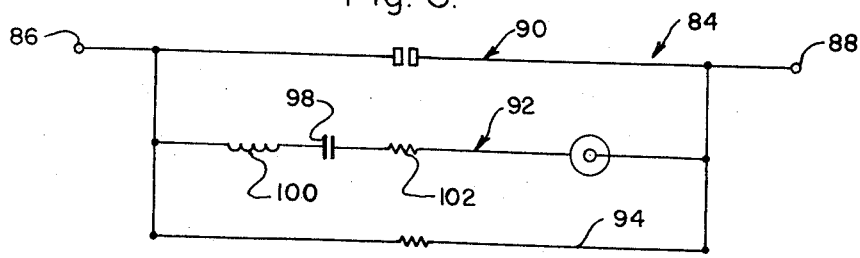
FIG. 6 is a schematic diagram of a simple AC current limiter using the forced commutation circuit of this invention.

The circuit breaker system employing an in-line branch and interrupter branch can be applied in alternating current systems, as well as the direct current systems described above. FIG. 6 illustrates a current limiter 84 particularly useful for the insertion into an AC system to limit the AC system current, particularly when the system current is excessive. Current limiter 84 is connectable by means of terminal leads 86 and 88 serially into an AC system. It contains an in-line branch 90 and an interrupter branch 92, respectively, identical to the branches 62 and 64 of circuit breaker 40. In the form of a current limiter, it has a resistive branch 94 in parallel to both the parallel connected in-line branch 90 and interrupter branch 92.

When current limiter 84 is furnished as part of an AC system and current limitation is required, the in-line branch 90 and interrupter branch 92 are actuated, as previously described. The current is reduced to zero through the in-line branch, as previously described, and the interrupter branch 92 is then turned off. The polarity of precharged capacitor 98 doesn't matter, providing the interrupter branch 92 is less than critically damped. When capacitor 98 has a value of 100 microfarads, inductor 100 has a value of 100 microhenrys and resistor 102, which represents the entire resistance of the branch, is 0.1 ohms, this condition is fulfilled. In this case, oscillation through the interrupter branch 92 and in-line branch 90 is damped to 1/e after about three cycles. This oscillation is sufficient to cause a current zero to occur in the open switch in the in-line branch. the oscillation period is 0.6 milliseconds. The necessary reverse voltage across the in-line switch in the in-line branch occurs sufficiently soon for acceptable offswitching. When the in-line switch is deionized, the crossed-field switch in interrupter branch 92 is thereupon offswitched. Now, resistive branch 94 is inserted into the circuit to provide impedance. The special situation for use in an alternating current system is that the crossed-field switch must be able to conduct in either direction. Several patents have been referred to in the above specification to illustrate specific embodiments or specific structures. The disclosures of those patents are incorporated herein by this reference.

Figure 7:
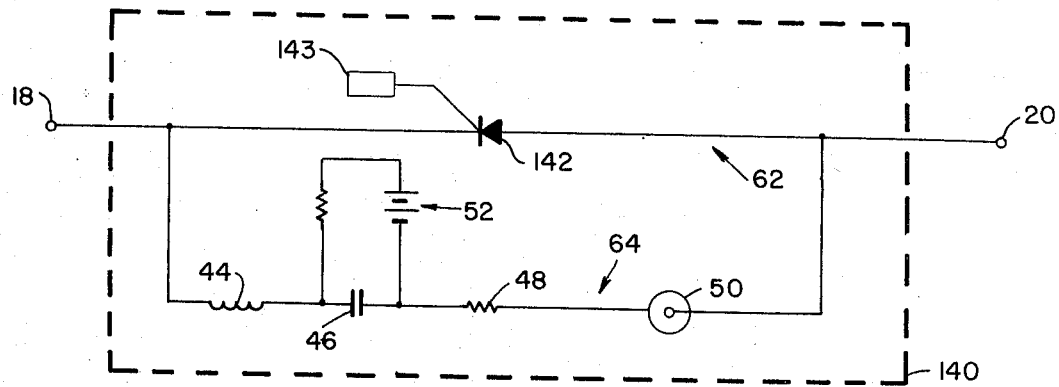
FIG. 7 is a schematic diagram of the forced commutation circuit of this invention, where the in-line device is an SCR.

FIG. 7 schematically illustrates a circuit breaker 140 which is quite similar to the circuit breaker 40 of FIG. 3. The same components are illustrated by the same numbers. In circuit breaker 140, the in-line device is one or more serially-connected silicon-controlled rectifiers 142. The SCRs are controlled by a suitable SCR gate control system 143. The previously-described in-line devices 42 are not as quick operating as an SCR. Some electronic components require protection within tens of microseconds after a fault occurs. This can be accomplished by circuit breaker 140, because the SCRs are used. In the case of circuit breaker 140, if a mechanical in-line switch is used, it could not open as fast as the SCR and thus would not be able to provide protection in the short time span possible with circuit breaker 140.

Figure 8:
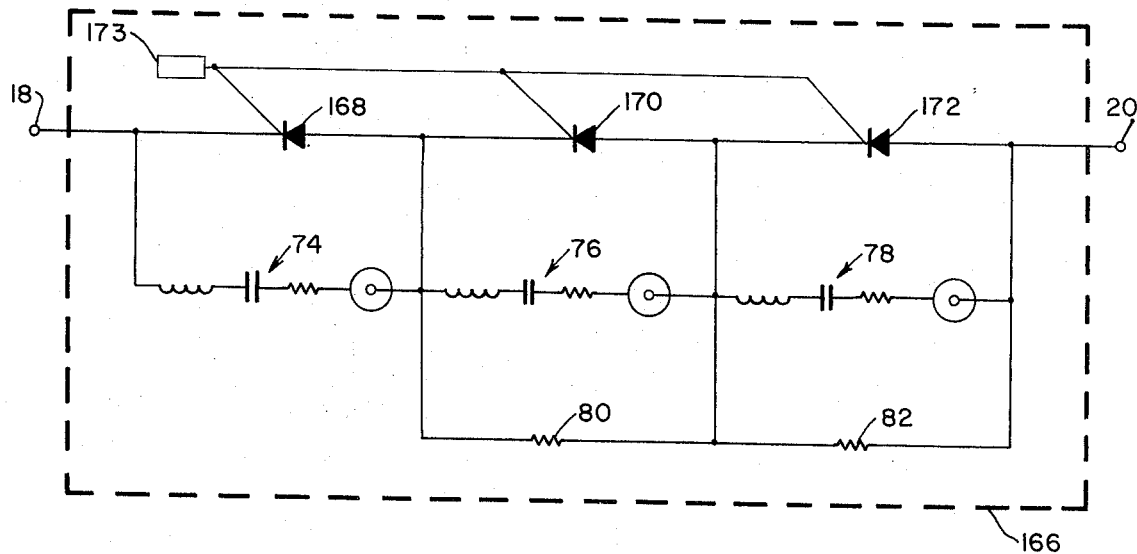
FIG. 8 is a schematic diagram of a sequential circuit breaker employing the circuit of FIG. 7.

Circuit breaker 166 illustrated in FIG. 8 is similar to the circuit breaker 66 of FIG. 5; however, in the circuit breaker 166, SCRs are the in-line devices in in-line branches 168, 170, and 172. The SCRs in these branches can be series or parallel units in each branch, depending on the voltage and current considerations. The SCRs are controlled by SCR controller 173; thus the circuit breaker 166 operates virtually identically to the circuit breaker 66, except, through the employment of SCRs in the in-line branches, circuit breaker 166 can operate in a much faster switching mode.

Figure 9:
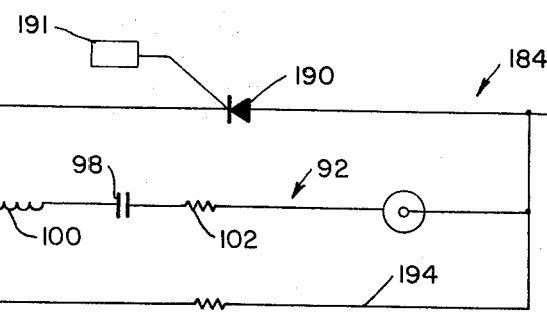
FIG. 9 is a schematic diagram of a simple AC current limiter using SCRs as an in-line device and using the forced commutation circuit of this invention.

FIG. 9 illustrates an AC current limiter 184 similar to current limiter 84 in FIG. 6. Again, in-line branch 190 contains an SCR as the in-line device. The SCR is controlled by an SCR controller 191. One or more series or parallel SCRs can be employed, depending upon voltage and current conditions. Switching the current into the impedance branch 194 can be more rapidly accomplished when using the SCR as the in-line off-switching device.

It will be appreciated that both the mechanical switch and the SCR have three common conditions. One is the high impedance state. In this case, the mechanical switch parts are separated and no current is conducted. In the case of the SCR, this is a nonconductive state where the gate is not biased toward conductivity. The second state is the low impedance state where the mechanical contacts are closed. the similar state for the SCR is where the gate is biased for conductivity. The third state is referred to herein as the planned nonconductivity state. In this case, the mechanical contacts are open, but conductivity remains in the low impedance state due to arcing. As soon as the arc is terminated and the space between the contact is deionized, the mechanical switch is in the high impedance state. Thus, in the planned nonconductive state, the switch is ready for the transition from the low impedance to the high impedance state, upon deionization. This is accomplished in accordance with the present invention by providing a sufficient current zero to reduce the current flow below the point where the threshold voltage will stop the arcing and permit deionization. A similar planned nonconductive state is achieved with the SCR when its gate is not biased toward conductivity. Thus, upon reaching the threshold voltage, conductivity ceases. Therefore, the transition from the low impedance planned nonconductive state to the high impedance state is achieved by reduction in current until the SCR is below the appropriate threshold current of voltage. Thereupon, voltage drop can build up across the in-line device. In another visualization of this state, the in-line devices can be understood to be conditioned to be nonconductive so that they change from the low impedance to the high impedance state upon receipt of proper current and voltage conditions to cause change of the device from the condition nonconductive to the nonconductive for high impedance state.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A circuit breaker for serial connection into an electric circuit for operation at line voltage between a power supply and a load for the breaking of the electric circuit between the power supply and the load, comprising:

an in-line branch having a controllable electrically conductive device to create electrical continuity for carrying the normal line current and for becoming nonconductive upon operation to nonconductive control condition and cessation of current therethrough to terminate electrical continuity through said in-line branch, said in-line branch device being capable of holding off line voltage;

an interrupter branch connected in parallel to said in-one branch, said interrupter branch having therein a capacitor having a voltage holdoff rating less than line voltage and serially connected thereto a crossed-field switch device means for holding off line voltage thereto when nonconductive, for onswitching with voltage applied and for offswitching current and for holding off line voltage, said crossed-field switch device means being serially connected with said capacitor so that said capacitor can be precharged when said crossed-field switch device means is nonconductive and said capacitor can be discharged upon making such crossed-field switch device means conductive to cause cessation of current in said in-line branch to cause said in-line branch device to become nonconductive and said crossed-field device means being also for offswitching against current in said interrupter branch to offswitch current into said capacitor so that said capacitor has a lower voltage thereacross than line voltage.

2. The circuit breaker of claim 1 wherein a resistor is connected in parallel to said interrupter branch.

3. The circuit breaker of claim 1 wherein said electrically conductive device in said in-line branch is a mechanical switch which has mechanical contacts which are normally in physical contact to create mechanical and electrical continuity for carrying the normal line current and for opening to terminate mechanical and electrical continuity through said in-line branch.

4. The circuit breaker of claim 1 wherein said electrically conductive device in said in-line branch is a silicon-controlled rectifier which can be controlled to become electrically conductive and can be controlled to become and remain nonconductive upon cessation of current therethrough.

5. The circuit breaker of claim 1 wherein there are first and second serially-connected in-line branches, and first and second serially-connected interrupter branches respectively connected in parallel to said first and second in-line branches, and wherein there is a resistor connected in parallel to said second interrupter branch.

6. The circuit breaker of claim 5 wherein there is an inductance connected in series with said capacitor in each of said interrupter branches to control the capacitor discharge in each said branches.

7. The circuit breaker of claim 6 wherein said circuit breaker is connected to both a power supply and a load to control current flow from said power supply to said load.

8. The method of controlling the flow of an electric current through a circuit having an in-line branch which has a controllable in-line device having a low impedance state, a high impedance state and a conditioned for nonconductive state, and which has an interrupter branch with a serially-connected capacitor with a voltage holdoff capability less than line voltage and crossed-field switch device connected in parallel to said in-line branch, comprising the steps of:

controlling the in-line device to the low impedance state so that it is conducting electric current;

conditioning the in-line device to the nonconductive state;

rendering the crossed-field switch device conductive to discharge the precharged capacitor to cause a current zero in the in-line device to permit the cessation of conduction in the high impedance state;

continuing current conduction through the crossed-field switch device and capacitor for a sufficient length of time to permit said in-line device to withstand voltage thereacross; and stopping conduction through said interrupter branch when the voltage across the capacitor is below line voltage by causing the crossed-field switch device to become nonconductive so that circuit voltage builds up across the opened and deionized in-line device.

* * * * *